United States Patent
Peterson

(10) Patent No.: US 8,132,733 B2
(45) Date of Patent: Mar. 13, 2012

(54) LIGHT-ACTIVATED ASSISTIVE READING DEVICE FOR VISUALLY IMPAIRED INDIVIDUALS

(75) Inventor: Christopher A Peterson, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1087 days.

(21) Appl. No.: 11/560,104

(22) Filed: Nov. 15, 2006

(65) Prior Publication Data
US 2008/0110390 A1    May 15, 2008

(51) Int. Cl.
*G06K 19/00* (2006.01)

(52) U.S. Cl. ........ 235/487; 235/375; 235/439; 235/454; 235/494; 340/407.1; 340/407.2; 434/113; 434/114; 434/115

(58) Field of Classification Search .................. 235/454, 235/375, 439, 487, 494; 434/113, 114, 115; 340/407.1, 407.2
See application file for complete search history.

(56) References Cited

U.S. PATENT DOCUMENTS

| | | | | |
|---|---|---|---|---|
| 3,594,787 A | * | 7/1971 | Ickes | 340/407.2 |
| 5,496,174 A | * | 3/1996 | Garner | 434/114 |
| 5,574,576 A | * | 11/1996 | Martin | 358/484 |
| 5,580,251 A | * | 12/1996 | Gilkes et al. | 434/113 |
| 5,650,217 A | * | 7/1997 | Skrivanek et al. | 428/195.1 |
| 5,766,013 A | * | 6/1998 | Vuyk | 434/114 |
| 5,942,970 A | * | 8/1999 | Norman | 340/407.1 |
| 6,354,839 B1 | * | 3/2002 | Schmidt et al. | 434/113 |
| 6,636,202 B2 | * | 10/2003 | Ishmael et al. | 345/173 |
| 6,765,079 B2 | * | 7/2004 | Saminathan et al. | 526/322 |
| 7,113,177 B2 | * | 9/2006 | Franzen | 345/173 |
| 2007/0103432 A1 | * | 5/2007 | Yee et al. | 345/156 |

OTHER PUBLICATIONS

Y. Zhao, New photoactive polymer and liquid-crystal materials, Pure Appl Chem., vol. 76, Nos. 7-8, pp. 1499-1508 (2004).
Arizona Technology Enterprises, LLC, "Light Activated Moving Polymer", (Undated, printed from World Wide Web Oct. 2006).
S. Graham, "Scientists Use Light to Make Polymers Change Shape and Size", Scientific American Jul. 3, 2001.
E Thomson, "Intelligent plastics change shape with light", Massachusetts Institute of Technology News Office, Apr. 13, 2005.
Foresight Nanotech Institute, "German researchers demonstrate light-driven nanoscale mechanism", web log entry posted May 21, 2002.
Openloop, "Shape Change Materials: light actuator" (Undated, printed from World Wide Web Oct. 2006).

* cited by examiner

*Primary Examiner* — Ali Sharifzada
(74) *Attorney, Agent, or Firm* — Roy W. Truelson

(57) ABSTRACT

An assistive reading device for visually impaired users comprises a sheet-like member containing a photo-active material. The sheet-like member responds to light patterns representing data from a patterned light source to form tactile shapes on its surface. The visually impaired user obtains information by touching the tactile shapes. Preferably, the photo-active material is a layer of cross linked azobenzene liquid-crystalline polymers. The assistive reading device preferably is an output device for a computer.

9 Claims, 5 Drawing Sheets

LIGHT-ACTIVATED ASSISTIVE READING DEVICE FOR VISUALLY IMPAIRED INDIVIDUALS

FIELD OF THE INVENTION

The present invention relates to assistive devices for visually impaired individuals, and in particular to assistive devices to enable visually impaired individuals to use digital data devices such as computers and the like.

BACKGROUND OF THE INVENTION

In the latter half of the twentieth century, there began a phenomenon known as the information revolution. While the information revolution is a historical development broader in scope than any one event or machine, no single device has come to represent the information revolution more than the digital electronic computer. The development of computer systems has surely been a revolution. Each year, computer systems grow faster, store more data, and provide more applications to their users.

The reduced cost of computing and the general availability of digital computing devices has brought an explosion in the volume of information available on such devices, and in the variety of applications to which such devices are put. For some years now, inexpensive "personal computers" have been available for personal use at home or for the use of a single individual at a place of business. Increased miniaturization has made it possible to design portable "laptop" computers and personal digital assistants (PDAs). These devices, together with the prevalence of the Internet, have brought digital information and computing capabilities to the public on a mass scale.

One consequence of these developments is that individuals who, for whatever reason, lack access to computer technology, are at a disadvantage, and this disadvantage grows in significance with each passing year. For example, it is now common for colleges and universities to communicate with students concerning schedules, assignments, grades and so forth, over the Internet. In some institutions, this reliance on the Internet has reached an extent that it is difficult or impossible to complete required courses without use of the Internet, a trend which is likely to continue. Such a use of digital technology and the Internet shows signs of further expansion into high school and lower level curricula.

Despite these developments, many individuals remain either unable to perform basic tasks involving the use of a computer, or less than proficient in the performance of such tasks. There are many and various reasons for these deficiencies, not all of which are addressed herein. For some individuals, lack of computer capability is due primarily or partially to physical handicaps, which make it difficult or impossible for the individual to use conventional digital input and output devices.

One particular group of individuals who find it difficult to use many common digital devices is the visually impaired. Most digital devices present output in the form of a visual display, which a visually impaired person may find difficult or impossible to read. Furthermore, digital input devices, although not strictly speaking visual, often rely on an interaction of visual output with a selection mechanism, such as a mouse.

Various mechanisms exist in the art to compensate for visual impairments to provide at least some degree of function to at least some visually impaired individuals. For example, for certain individuals with mild visual impairments, an output display of a digital device can be programmed to display information in a magnified form, or using special fonts, colors, or other characteristics, to make it easier for the visually impaired user to see. For individuals with more profound visual impairments, text-to-speech synthesizers are sometimes used to render textual information in audible form. These are various other techniques provide some degree of access to visually impaired users.

As useful as these conventional mechanisms are, in general visually impaired individuals remain at a disadvantage vis-a-vis people of normal vision when it comes to using digital device technology. Some forms of information, particularly graphical information, is difficult or impossible to render in audible form. Still other information could be rendered audibly or in some other suitable form, but there are other problems with doing so, such as privacy, security, interference, or similar concerns. In some cases, modification of an interface may be so radical that it just hasn't been done. Finally, even though visual information can be rendered in audible form, it may simply be a much slower and less efficient means of conveying information to the user, so that the visually impaired user still suffers a considerable disadvantage.

A need therefore exists for continued improvements to the way in which visually impaired persons interface with digital devices, and in particular to the way in which information from a digital device is conveyed to a visually impaired user.

SUMMARY OF THE INVENTION

An assistive reading device for visually impaired users comprises a sheet-like member containing a photo-active material, such as a photo-active polymer, which is positioned over a patterned light source. The patterned light source generates patterns representing information, such as a pattern of braille text or a pattern representing graphical information. The photo-active material responds to light emitted by the light source to form tactile shapes on the surface of the sheet-like member. The visually impaired user obtains information by touching the tactile shapes.

In the preferred embodiment, the photo-active material comprises an azobenzene or azopyridine polymer, and more particularly is a layer of crosslinked azobenzene liquid-crystalline polymers. The photo-active layer is preferably covered with a thin, opaque coating on a single side facing outwards from the light source, to block the light source and to prevent interference from ambient light. The light source emits light at selective locations at a specific wavelength (e.g., in the ultraviolet range) to cause local buckling of the photo-active layer at the selective locations. The light source can be a matrix of multiple lasers corresponding to respective selective locations, or a single laser which is aimed at selective locations by scanning and selectively switching on and off. Preferably, the light source also includes a laser source for producing light of a second specific wavelength to restore local areas of the photo-active layer to an original (unbuckled) state, thereby "erasing" data represented thereon.

In an exemplary embodiment, the patterned light source is coupled to an interactive digital device, such as a computer workstation, to form an output device for presenting output to a user, similar to the output of a conventional display. The workstation converts display output designed for a conventional display to a format appropriate for output to the assistive reading device, such as converting text to braille. The visually impaired user reads output data of the interactive digital device by touching the tactile patterns generated on the sheet member.

It is anticipated that, as the properties of photo-active materials improve, and in particular their response time and photo-sensitivity improves, further applications will become practical. In particular, in a predictive embodiment, a sheet-like member of a photo-active material is sufficiently sensitive to respond to light emitted by a conventional display device of a computer workstation, such as a cathode ray tube or light-emitting diode display, and is fitted over the conventional display device to provide a tactile representation of data displayed on the conventional display.

An assistive device as described herein thus provides the capability for visually impaired individuals to interact with a conventional digital device and receive information from that device to an improved extent, which is not easily or practicably enabled using purely conventional means.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Overview

In accordance with the preferred embodiment of the present invention, an assistive device for visually impaired users is adapted to an output patterned light source of a digital device, such as a computer system, and changes the shape of a reading surface responsive to light emitted by the light source to provide a tactile representation of certain information output by the light source.

Ideally, such an assistive device would have sufficient sensitivity to light to respond to the light of a conventional digital display output device, such as a cathode ray tube display, and sufficient rapidity of response to change its shape in some fraction of a second, so that delay is not noticeably perceptible to a human user. Such a device could convert any information displayed on a conventional display to a tactile form in real time. It might be used for rendering graphics and/or text (in the form of braille or other encodings) to the user. It may even be a portable device separate from the display itself, which is attached to different displays as required by a user.

Various materials are known to exhibit photo-active properties, whereby the material responds to incident light by changing its shape. However, at the present time the photo-active properties of available materials are such as to limit the practical uses to which such materials may be put. Specifically, conventional photo-active materials tend to either have relatively slow response times or impose special requirements (wavelength, illumination) on the incident light, which may make it difficult or impossible to achieve the ideal described above. But even with currently available photo-active materials, it would be possible to construct certain simplified embodiments of the present invention of the type described further herein.

It is expected that as further improvements are made to photo-active materials to increase photo-sensitivity, reduce response time, and/or improve other properties, further and improved embodiments of the present invention will become practical.

Detailed Description

Figure 1:
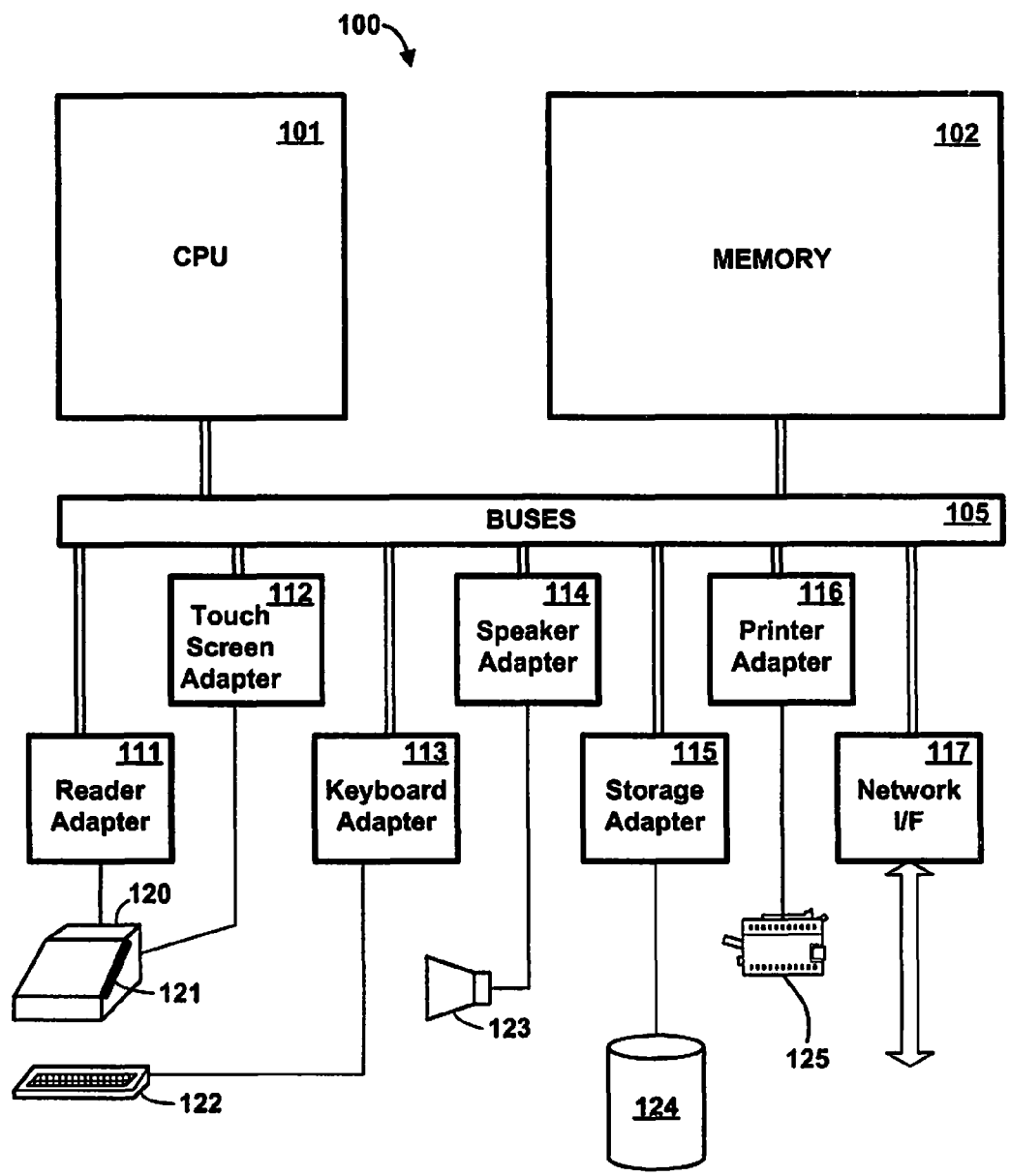
FIG. 1 is a block diagram illustrating the major components of a digital device, specifically a single-user computer system, suitable for outputting data to an assistive reading device, in accordance with the preferred embodiment of the present invention.

Referring to the Drawing, wherein like numbers denote like parts throughout the several views, FIG. 1 is a block diagram illustrating the major components of a digital device, specifically a single-user computer system, also known as a desktop or workstation, suitable for outputting data to an assistive reading device, in accordance with the preferred embodiment. System 100 includes CPU 101, main memory 102, various device adapters and interfaces 111-116, and communications bus 105. CPU 101 is a general-purpose programmable processor, executing instructions stored in memory 102; while a single CPU is shown in FIG. 1, it should be understood that computer systems or other digital devices having multiple CPUs could be used. Memory is a random-access semiconductor memory for storing data and programs; memory is shown conceptually as a single monolithic entity, it being understood that memory is often arranged in a hierarchy of caches and other memory devices. Communications bus 105 supports transfer of data, commands and other information between different devices; while shown in simplified form as a single bus, it may be structured as multiple buses, and may be arranged in a hierarchical form.

Reader adapter 111 supports output to assistive reading device 120, which is described more fully herein. In the exemplary embodiment, assistive reading device 120 is intended to provide equivalent function of a visual display unit, for the benefit of visually impaired individuals. Reader adapter 111 is an adapter/driver which forms an interface between buses 105 and assistive reading device 102, and as such contains necessary interface hardware, buffers and so forth for receiving, buffering, and driving output to the assistive reading device. Preferably, assistive reading device 120 uses a hardware interface equivalent to that of a visual display unit, such as a cathode ray tube display. In this case, reader adapter 111 can be a conventional display adapter such as is commonly used to drive any of various visual display units. Reader adapter 111 may alternatively be an adapter/driver specially designed to interface with assistive reading device 120.

Touchscreen adapter 112 supports a touchscreen input device 121. Touchscreen input device 121 is preferably an input device which senses touch from a user's finger in the form of pressure on the surface of assistive reading device 120, and determines a location of the touch in the plane of the reading surface. Various such touch screen technologies are known for use with conventional visual displays of computers and similar devices, and some of these technologies would be suitable for use with reader 120. For example, in a preferred embodiment, touch screen input device comprises a set of pressure sensors at the corners of reader 120, the outputs of the pressure sensors being compared to compute an X and Y coordinate location of the applied pressure (touch). However, other forms of touch screen technology might alternatively be used. Furthermore, although a touchscreen is the preferred pointing input device because it naturally interacts with a visually impaired user's feeling the reading surface, it would alternatively be possible to use other forms of pointing device, or to use no pointing device at all.

Keyboard adapter 113 supports keyboard 122 for receiving textual and other input from the user. Speaker adapter 114 supports an audible speaker 123 for providing selective output to a user in audible form. Storage adapter 115 supports one or more data storage devices 124, which are typically rotating magnetic hard disk drives, although other data storage devices could be used. Printer adapter 116 supports printer 125, which could include a braille printing device. Network interface 117 provides a physical interface to an external network, such as a local area network or the Internet. Network interface may also or alternatively provide a connection to a larger "mainframe" computer system, for which system 100 acts as a terminal to access data and applications stored thereon.

System 100 is shown in FIG. 1 as a single-user desktop computer system of the type known as a "personal computer" or "workstation". The representation of FIG. 1 is intended as an exemplary simplified representation, it being understood that many variations in system configuration are possible in addition to those mentioned here. Furthermore, a digital device producing output to an assistive reading device in accordance with the present invention need not be a single-user personal computer system, and may be a larger computer system, a notebook or laptop computer, or any of various special purpose digital devices, such as a portable digital assistants (PDAs), a cell phone, a game station, a multimedia presentation system, a portable wireless web accessing device, and so forth.

Figure 2:
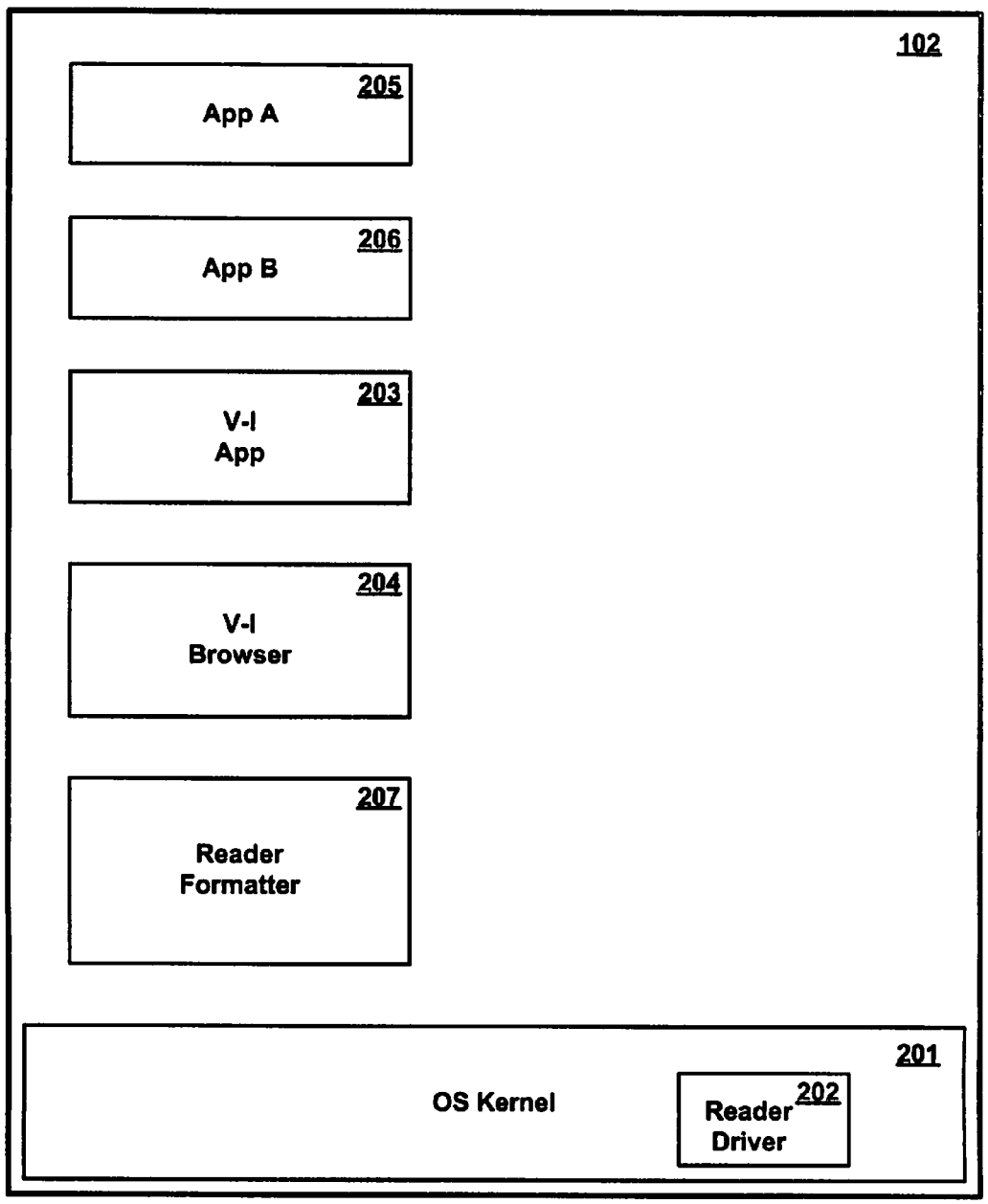
FIG. 2 is a conceptual representation of various software components of a computer system for outputting data to an assistive reading device, according to the preferred embodiment.

FIG. 2 is a conceptual representation of various software components of system 100 residing within memory 102. Operating system kernel 201 is an executable computer program which provides various low-level software functions, such as allocation of main memory, management of memory pages, task dispatching, management of multiple task state data, etc. as is well-known in the art. OS kernel 201 includes in particular drivers for the various I/O device adapters 111-117, including reader driver 202 which communicates with reader adapter 111 to support reader 120.

System 100 may include one or more application programs which produce output in a form specially formatted to be output to reader 120 for use by a visually impaired individual. FIG. 2 represents two such applications for the visually impaired 203, 204. Such applications could be any of numerous conventional computer applications, such as well known word processing, financial management, calendaring, database management, software development, and any of thousands of others. In general, an application for the visually impaired works in the same manner as a conventional counterpart for users without visual impairment, except that output normally displayed on a visual display screen is specially formatted for use by a visually impaired individual. In particular, output is formatted for reader 120.

In an exemplary embodiment, one such special application program for the visually impaired is visually impaired web browser 204. As is known, a conventional web browser application acts as a client which accesses various server applications (web servers) located remotely and which communicate with the client over the Internet. The web browser client accesses web servers to request web pages, renders web pages (e.g., pages in HTML format) into a displayable format for a user, provides user input to the server as required, maintains a list of "favorite" URLs, and performs various other auxiliary functions for conveniently browsing the web. The rendering of web pages in a displayable form for the user is an important constituent of conventional web browsers.

The V-I browser 204 of the exemplary embodiment is a conventional browser in which the display screen output, and in particular the rendering and formatting of web pages to received over the Internet in HTML or other format, has been suitably modified for output to reader 120. Specifically, text such as HTML text or similar text is converted wherever possible to a braille representation, i.e. a series of dots. Graphics, photos and the like are either rendered in simplified form or removed altogether. A V-I browser process for converting web pages for output to reader 120 is described in greater detail herein with respect to FIG. 5.

System 100 may also include any of various conventional application programs 205-206, of which two are represented in FIG. 2. Conventional applications 205, 206 are unmodified applications which produce output formatted for a conventional visual display screen. System includes a reader formatter 207 for formatting screen output produced by conventional applications in a format suitable for reader 120. Reader formatter 207 is a program or function which formats screen output for reader in much the same way that V-I browser 204 formats output, i.e., by reducing the screen size (number of pixels) to coincide with the resolution of reader 120, converting text where possible to braille representations, and removing or simplifying graphics. Although depicted in FIG. 2 as a separate entity, reader formatter 207 could be part of the operating system.

It will be appreciated that, in general, a better output format can be achieved if an application is specially modified for output to reader 120. For example: text may be altered in some cases to fit within a convenient space; if it is known that certain graphic images will be difficult to understand on reader 120, the images could be omitted or replaced by others; etc. However, it must also be recognized that due to the cost of converting applications, many conventional applications might not be available in a form specially designed for reader 120, and for such applications some form of automated formatting as performed by reader formatter 207 is desirable. In the preferred embodiment, the user configures the display screen output of selective applications to be filtered by reader formatter 207. When OS kernel 201 receives display output from such an application, it invokes reader formatter 207 to format the display output in lieu of certain conventional display output functions of the operating system.

Although a certain number of applications and other software entities are shown for illustrative purposes in FIG. 2, it will be understood that the number of such entities may vary, and is typically greater, and that other and additional entities not represented will typically be present in a fully functioning system. While the software components of FIG. 2 are shown conceptually as residing in memory 102, it will be understood that in general the memory of a computer system will be too small to hold all programs and data simultaneously, and that information is typically stored in data storage device 124, comprising one or more mass storage devices such as rotating magnetic disk drives, and that the information is paged into memory by the operating system as required.

Figure 3:
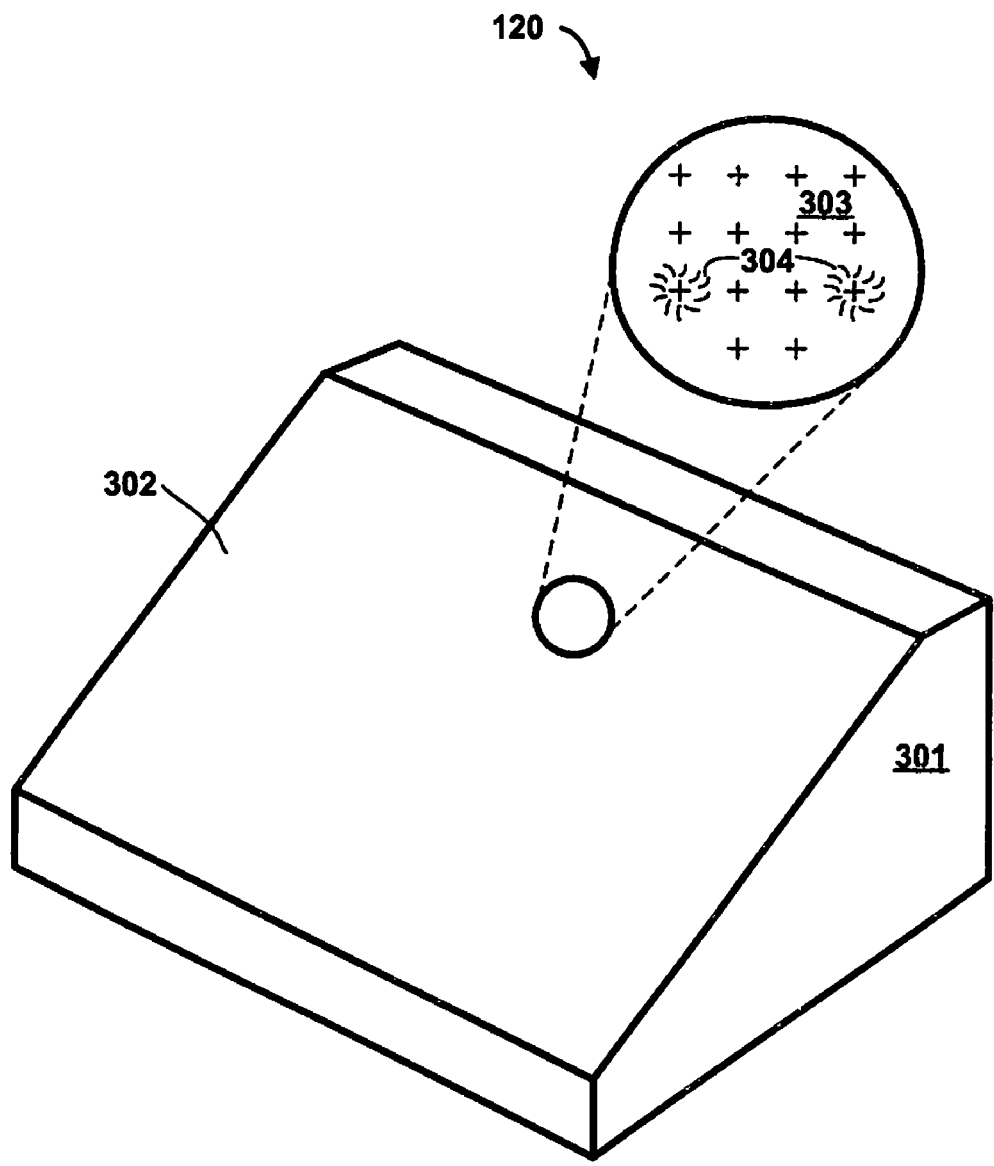
FIG. 3 is a simplified front perspective view of an assistive reading device, according to the preferred embodiment.
Figure 4:
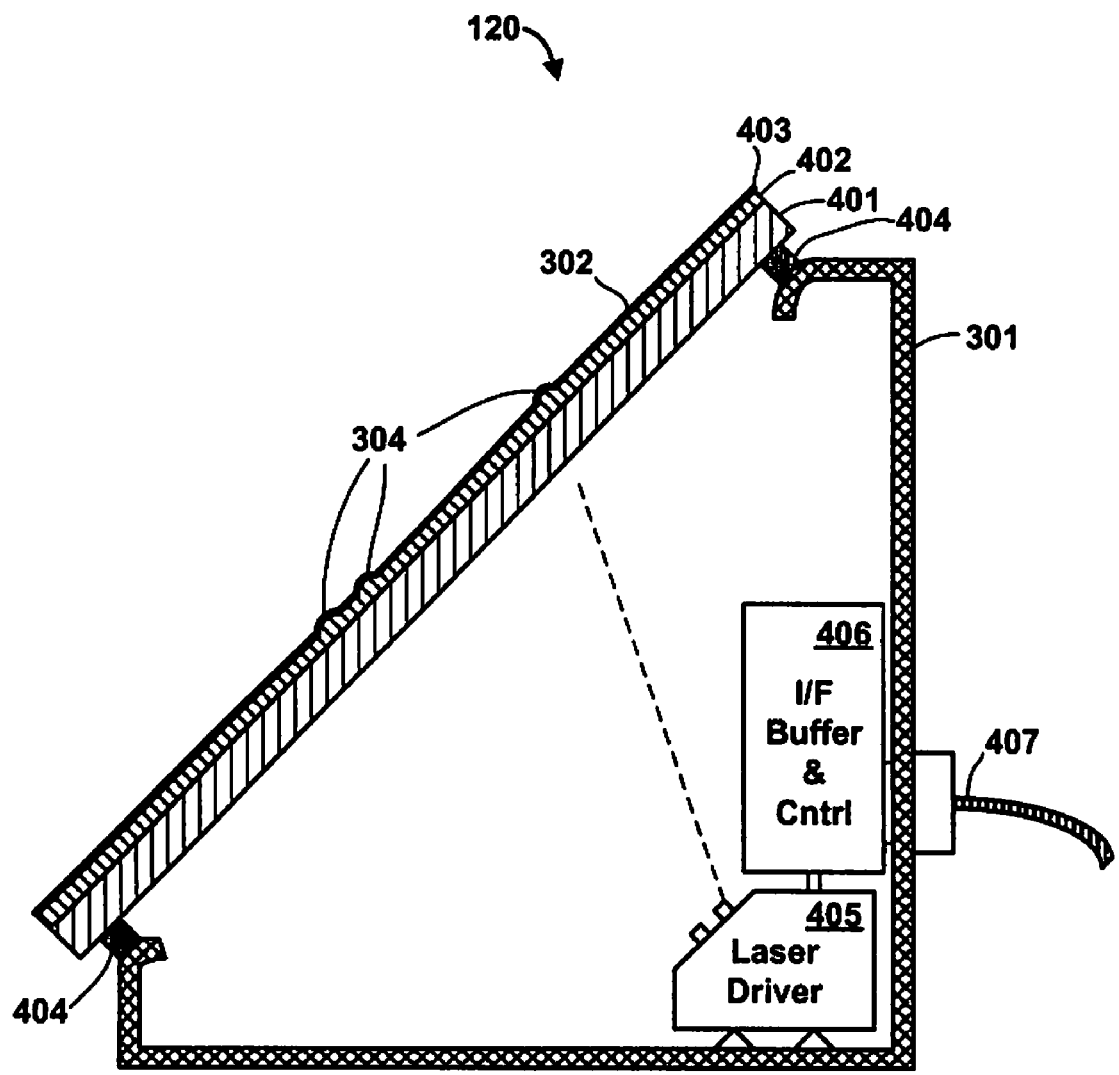
FIG. 4 is a simplified sectional view of an assistive reading device showing certain structural features, according to the preferred embodiment.

FIGS. 3 and 4 are simplified representations of assistive reading device 120, according to the preferred embodiment. FIG. 3 shows is a front perspective view of the device, showing a matrix of photo-active locations on a reading surface of the device. FIG. 4 is a sectional view of the device showing the structure of the reading surface and laser activating components located behind the reading surface.

Assistive reading device comprises a housing 301 having a substantially flat, rectangular reading surface 302, which is preferably oriented at an oblique angle from vertical for comfort and ease of use. A matrix of photo-active locations 303 is defined on the reading surface, depicted in the inset to FIG. 3. The matrix is shown in FIG. 3 as an array of cross-hair markings; however, it should be understood that the matrix is merely a definition of locations at which a laser may activate the photo-active material, and is does not necessarily comprise visible markings on the reading surface or discrete structural components. The matrix may be rectangular as shown in FIG. 3, or may be staggered or triangular (i.e., in which adjacent locations define the vertices of equilateral triangles), or some other configuration. The photo-active locations 303 may be analogized to pixels of a conventional visual display, although it is expected that the reading surface of the preferred embodiment would have a lower resolution than a conventional visual display (i.e. a smaller number of photo-active locations than pixels in a conventional display).

The reading surface is preferably constructed as a sandwich of multiple layers, each of uniform composition. A transparent underlayer 401, which is preferably glass, provides structural support for the reading surface. A photo-active layer 402 is positioned over the glass. Because photo-active materials are generally transparent, for safety and other reasons an opaque coating 403 covers the photo-active layer and prevents the light output of the laser from being seen in the environment of the user. The opaque layer also reduces any possible interference from ambient light. The underlayer 401 is mounted at pressure sensors 404, which form part of a touch screen input apparatus 121.

Photo-active layer 402 can be any material, now known or hereafter developed, which will exhibit appropriate mechanical deformation when exposed to light, which could be light of a broad spectrum or of a particular wavelength. Most current photo active materials are responsive to particular wavelengths of light, and for that reason one or more lasers are used for excitation in the preferred embodiment. However, photo-active materials developed in the future may exhibit a broad spectrum response. In particular it is preferred that photo-active layer 402 be an azobenzene or azopyridine polymer, such as a thin film of crosslinked azobenzene liquid crystal polymer.

Reading device 120 includes a laser driver unit 405 for driving at least one laser to excite selective locations in photo-active layer 402. Reading device further includes buffer, interface and control electronics 406 for communicating with reader adapter 111 via data cable 407, buffering data representing the state of the reader output, and translating data to appropriate signals for controlling laser driver unit 405.

Laser driver unit 405 includes at least one laser emitting light (which could be ultraviolet or infrared light) of a wavelength appropriate to cause excitation of photo-active layer 402. This light source may or may not be polarized, as appropriate to the photo-active material. The laser driver unit could contain a single driving laser, which is aimed by any appropriate means to scan the matrix locations 303 of reading surface 302, much as an electron beam scans a surface of a conventional cathode ray tube. The laser drive unit could alternatively contain multiple lasers, such as one laser for each row of matrix locations 303 (so that scanning takes place in only one dimension), or could even contain a separate laser for each individual location of matrix locations 303.

Where one laser is used to activate multiple locations of matrix 303 by scanning, the scan rate need not be as high as that of a conventional cathode ray tube, but will be related to the response time of the photo-active materials and the ability of a human user to perceive the excitation. In such a case, the power of the laser must be sufficiently large to cause human perceptible mechanical deformation of the surface in the relatively brief interval during the scan that a particular location is being excited by the laser.

Many photo-active materials will return to their original state after removal of the excitation (light), but will return to the original state faster if counter-excited by light of a different wavelength and/or polarization. In the preferred embodiment, laser driver unit 405 further contains at least one laser light source for relaxing the deformation caused by the original exciting light source, effectively erasing data on the screen so that new data can be written. As in the case of the excitation source, the counter-excitation light source can be a single source or multiple sources.

In operation, interface and buffer electronics 406 decodes data received from reader adapter 111 to cause laser driver 405 to excite selective locations of reader surface 302 by selectively switching the laser(s) on and off during scanning, or if a separate laser is used for each location, by selectively switching on the appropriate lasers. If a location of matrix 303 is exposed to the laser, the photo-active material changes shape in response, causing a local buckling or deformation on the reading surface, represented as feature 304. This deformation may appear as a bump on the surface, although the exact shape of the deformation will depend on the materials used and various construction details. The deformation may be any shape which will be perceptible by touch to a human user. The user feels the deformations and is able to read information from the reader accordingly. For example, the deformations may represent the familiar bumps of a braille text. The deformations could also represent graphical images of various types.

In general, it is expected that reader 120 will have a lower resolution than a standard visual display of a conventional desktop computer system, although the resolution may be comparable to the resolution of the visual display in a smaller, limited function device such as a personal digital assistant, cell phone or portable web access device. A standard output display image is converted for output to reader 120 by converting text to an appropriate symbolic representation such as braille, and reducing the features and resolution of the output so that it can be conveniently sensed by a user on reader 120.

Figure 5:
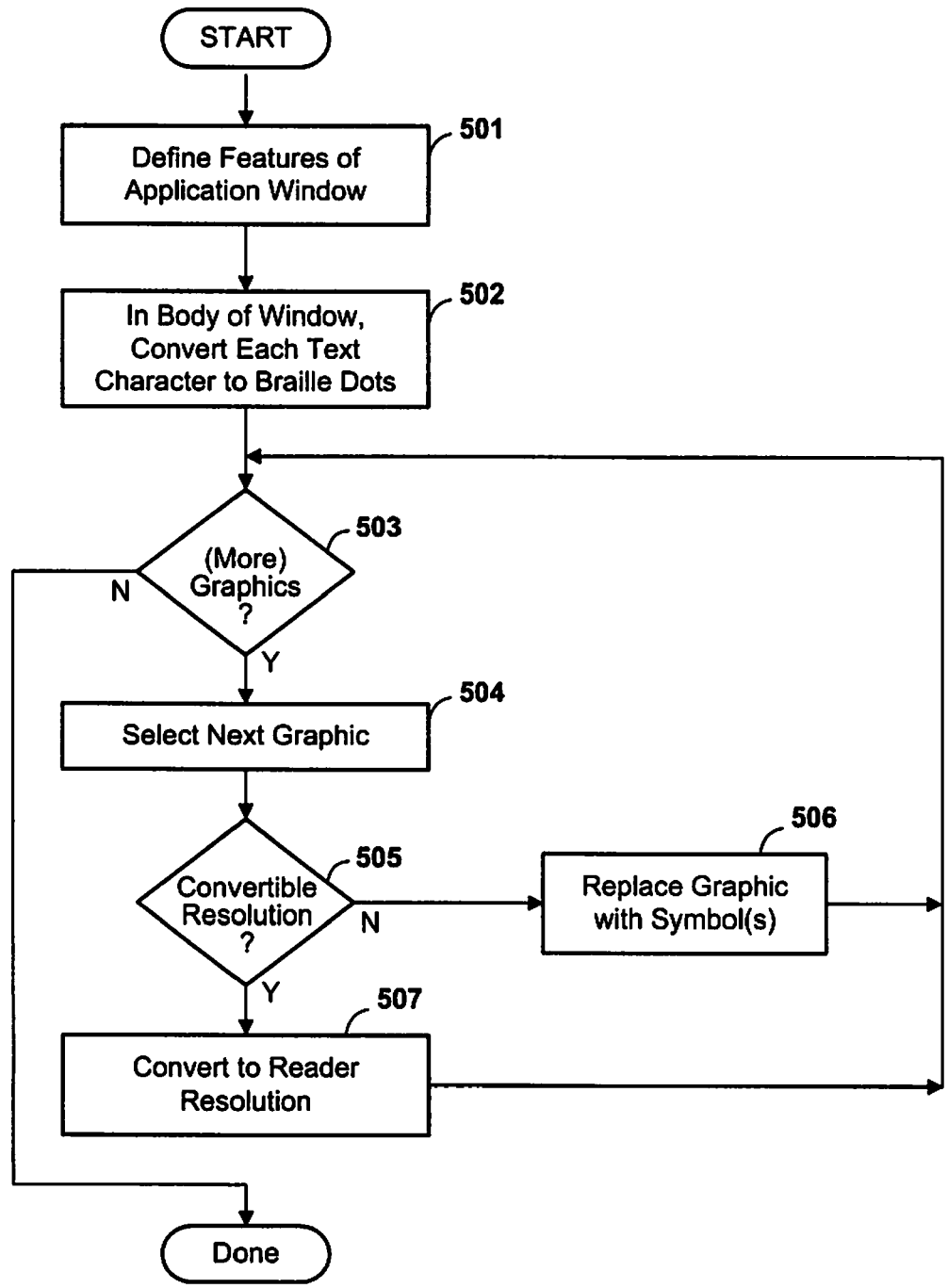
FIG. 5 is a high-level diagram of a process of converting a standard display image for an application program to an output for a tactile assistive reading device, according to the preferred embodiment.

FIG. 5 is a high-level diagram of a process of converting a standard display image for an application program to an output for reader 120, which will take the form of tactile deformations on the reader surface. I.e., the visible light output of a conventional display screen is replaced by tactile deformations of a pattern which has been modified as described below with respect to FIG. 5. Such a conversion process could be performed by reader formatter 207, or the application could be modified to produce output corresponding to that produced by the conversion process described. In the latter case, the application does not necessarily perform the conversion process, i.e., it does not necessarily generate one feature and then convert it to another. It may simply generate the output feature in the first instance.

Referring to FIG. 5, certain features of a simplified application window are defined (step 501). Preferably, the application window is simplified as much as possible to accommodate the lower resolution of the reader. E.g., where possible, toolbars and similar features will be reduced to single respective icons or letter combinations, which may be expanded in a pop-up window or the like by selecting them. This simplified window may have a narrower screen width than a standard window, which could be scrolled.

The body of the displayed matter within the window is converted for reader 120 by converting all text within the body to an appropriate symbolic representation, such as braille (step 502). E.g., each text character is converted to a corresponding series of dots in the braille alphabet. When output to reader 120, the laser(s) activate corresponding locations on the reading surface to cause local deformations (bumps) in the pattern of the braille dots.

If any graphic images in the body of the window must be converted (the 'Y' branch from step 503), a graphic is select for conversion (step 504). A determination is made whether the selected graphic image has suitable resolution for conversion (step 505). Specifically, if the graphic is a relatively high resolution image, such as a photograph, it may be difficult to produce a useful image, and the 'N' branch is taken from step 505. In this case, the graphic is replaced with a symbol or symbols, such as an icon or very short text, to indicate that a graphic has been deleted (step 506). If the graphic is sufficiently low resolution (e.g., a bar chart), it may be converted for output to reader by adjusting the resolution of the graphic for output to reader 120 (step 507). When all graphics have been converted, the 'N' branch is taken from step 503 and the process is complete.

Additional Variations and Embodiments

In general, the routines executed to implement the illustrated embodiments of the invention, whether implemented as part of an operating system or a specific application, program, object, module or sequence of instructions are referred to herein as "computer programs". The computer programs typically comprise instructions which, when read and executed by one or more processors in the devices or systems in a computer system consistent with the invention, cause those devices or systems to perform the steps necessary to execute steps or generate elements embodying the various aspects of the present invention. Moreover, while the invention has and hereinafter will be described in the context of fully functioning computer systems, the various embodiments of the invention are capable of being distributed as a program product in a variety of forms, and the invention applies equally regardless of the particular type of signal-bearing media used to actually carry out the distribution. Examples of signal-bearing media include, but are not limited to, volatile and non-volatile memory devices, floppy disks, hard-disk drives, CD-ROM's, DVD's, magnetic tape, and so forth. Furthermore, the invention applies to any form of signal-bearing media regardless of whether data is exchanged from one form of signal-bearing media to another over a transmission network, including a wireless network. Examples of signal-bearing media are illustrated in FIG. 1 as memory 102 and as storage device 124.

In the preferred embodiment, the assistive reading device is a self-contained device having its own light source(s) and control electronics, which receives data over an interface in a manner similar to that of a conventional visual display screen, and presents data to the user in the form of tactile representations on a relatively flat reading surface. However, it will be appreciated that in various embodiments, a reading device may be marketed as separate component parts, and that in particular, a reading surface which responds to incident light to form tactile shapes might be separate from a light source. As a further elucidation, future improvements to photo-active materials and/or changes to display screen technology may make it feasible to design independent reading surfaces which are intended to attach to the front of a display screen such as a cathode ray tube, and be activated by the light of the cathode ray tube. Such an application would make it possible to use many conventional components, such as the display screen and display screen driver, in place of special lasers for activating the photo-active surface, which would likely reduce the cost of a system employing an assistive reading device.

In the preferred embodiment, the assistive reading device is a data output device for a general purpose digital computer. It will be recognized that the assistive reading device could alternatively serve as an output device for numerous other types of digital devices. Furthermore, future improvements to photo-active materials might support a broader range of applications without the use of special light sources. For example, a portable assistive reading device could be used by the visually impaired to read lighted signs and the like.

Although a specific embodiment of the invention has been disclosed along with certain alternatives, it will be recognized by those skilled in the art that additional variations in form and detail may be made within the scope of the following claims:

What is claimed is:

1. A data output apparatus, comprising:
   a light source for selectively illuminating locations in a matrix of locations behind a reading surface to represent output data; and
   a reading surface mounted in a fixed location with respect to said light source, said reading surface comprising a smooth, uniform sheet member of a photo-active polymeric material which receives illumination at selective locations thereof by said light source, said photo-active polymeric material forming deformations at selective locations of said reading surface responsive to illumination in each respective selective location by said light source, said deformations being tactile perceptible to a human user.

2. The data output apparatus of claim 1, wherein said photo-active material is a photo-active polymer containing at least one of azobenzene or azopyridine.

3. The data output apparatus of claim 2, wherein photo-active polymer comprises a cross linked azobenzene liquid-crystalline polymer.

4. The data output apparatus of claim 1, wherein said light source comprises at least one laser.

5. The data output apparatus of claim 4, wherein said light source comprises at least one laser which is selectively aimed to illuminate selective locations of said matrix of locations.

6. The data output apparatus of claim 4, wherein said light source comprises a plurality of lasers, each laser for illuminating a respective discrete subset of said locations of said matrix of locations.

7. The data output apparatus of claim 1, further comprising an opaque layer over said photo-active polymeric material, said opaque layer blocking light from said light source.

8. The data output apparatus of claim 1, wherein said data output apparatus presents output data from a general purpose digital computer, and further includes a touch screen input device for sensing pressure applied to selective locations of said reading surface.

9. The data output apparatus of claim 1, wherein said light source comprises:
   a first light source emitting light at a first wavelength for activating selective locations of said photo-active material to generate tactile shapes therein; and
   a second light source emitting light at a second wavelength different from said first wavelength, for causing said selective locations of said photo-active material to resume a substantially flat shape.

\* \* \* \* \*